United States Patent
Nielsen et al.

(10) Patent No.: US 9,671,036 B2
(45) Date of Patent: Jun. 6, 2017

(54) ACTUATOR FOR A VALVE AND A VALVE COMPRISING SUCH ACTUATOR

(71) Applicant: ALFA LAVAL CORPORATE AB, Lund (SE)

(72) Inventors: Jesper Bak Nielsen, Vejen (DK); Johnny Ebsen, Kolding (DK)

(73) Assignee: ALFA LAVAL CORPORATE AB, Lund (SE)

( * ) Notice: Subject to any disclaimer, the term of this patent is extended or adjusted under 35 U.S.C. 154(b) by 65 days.

(21) Appl. No.: 14/397,374

(22) PCT Filed: Jun. 4, 2013

(86) PCT No.: PCT/EP2013/061485
§ 371 (c)(1),
(2) Date: Oct. 27, 2014

(87) PCT Pub. No.: WO2013/182560
PCT Pub. Date: Dec. 12, 2013

(65) Prior Publication Data
US 2015/0083946 A1 Mar. 26, 2015

(30) Foreign Application Priority Data
Jun. 7, 2012 (EP) .................................. 12171124

(51) Int. Cl.
*F16K 11/08* (2006.01)
*F16K 31/122* (2006.01)
(Continued)

(52) U.S. Cl.
CPC .......... *F16K 31/1225* (2013.01); *F16K 11/04* (2013.01); *F16K 27/07* (2013.01); *F16K 41/103* (2013.01)

(58) Field of Classification Search
CPC ........ F16K 27/07; F16K 41/103; F16K 11/04; F16K 31/1225
(Continued)

(56) References Cited

U.S. PATENT DOCUMENTS 4,339,155 A 7/1982 Hart
4,360,039 A 11/1982 Jeppsson
(Continued)

FOREIGN PATENT DOCUMENTS

| CN | 1576671 A | 2/2005 |
| CN | 1768229 A | 5/2006 |
| GB | 2 064 724 A | 6/1981 |

OTHER PUBLICATIONS

International Search Report (PCT/ISA/210) mailed on Oct. 4, 2013, by the European Patent Office as the International Searching Authority for International Application No. PCT/EP2013/061485.
(Continued)

*Primary Examiner* — Umashankar Venkatesan
(74) *Attorney, Agent, or Firm* — Buchanan Ingersoll & Rooney PC

(57) ABSTRACT

Actuator for a valve, comprising a first piston, a first piston rod and a first fluid chamber for enabling movement of the first piston and the first piston rod. The actuator has a second piston, a second piston rod, the second piston rod being coaxially arranged with the first piston rod and radially enclosing at least a part of the first piston rod. A second fluid chamber is arranged for the second piston, for enabling movement of the second piston and the second piston rod. A first fluid channel is arranged in communication with each of the first and the second fluid chambers, for effecting, when fluid is introduced into the first fluid channel, movement of the first piston and the second piston. Also, a valve comprising such actuator is disclosed.

14 Claims, 5 Drawing Sheets

Figure 1:
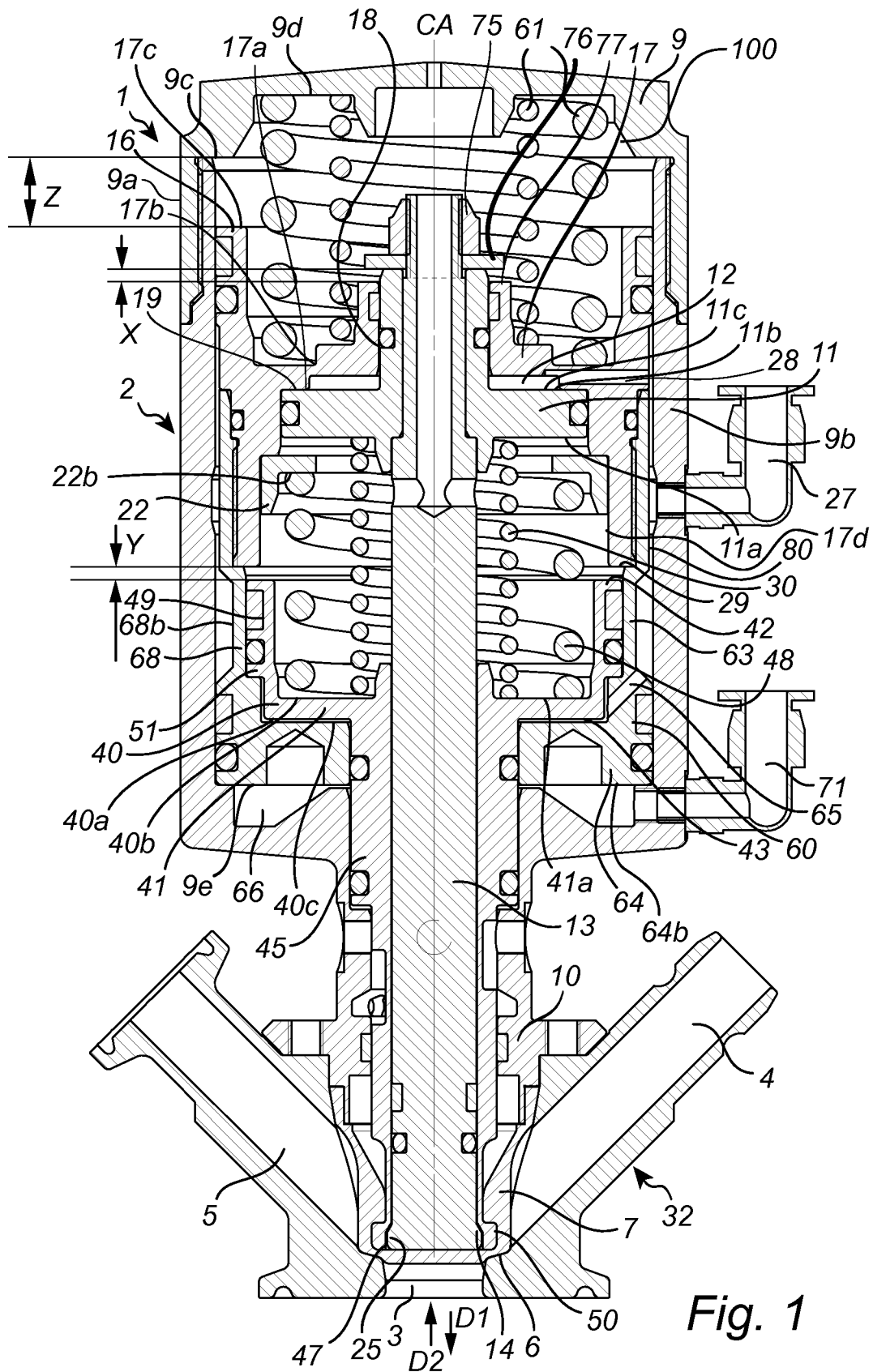

(51) Int. Cl.
*F16K 41/10* (2006.01)
*F16K 27/07* (2006.01)
*F16K 11/04* (2006.01)

(58) Field of Classification Search
USPC .............. 251/63.6; 137/605, 606, 607, 625.4
See application file for complete search history.

(56) References Cited

U.S. PATENT DOCUMENTS

| | | |
|---|---|---|
| 4,585,207 A | 4/1986 | Shelton |
| 4,776,562 A | 10/1988 | Kalaskie et al. |
| 4,934,652 A | 6/1990 | Golden |
| 6,014,983 A * | 1/2000 | Sondergaard ........... F16K 1/446 137/240 |
| 6,648,006 B1 * | 11/2003 | Ostergaard ............ F16K 41/103 134/166 C |
| 7,143,956 B2 | 12/2006 | Fukano |
| 7,192,003 B2 * | 3/2007 | Hoobyar ................... B08B 9/00 251/331 |
| 2002/0027211 A1 | 3/2002 | Kajitani |
| 2005/0006609 A1 | 1/2005 | Fukano |
| 2006/0197049 A1 | 9/2006 | Hamada et al. |

OTHER PUBLICATIONS

Written Opinion (PCT/ISA/237) mailed on Oct. 4, 2013, by the European Patent Office as the International Searching Authority for International Application No. PCT/EP2013/061485.
European Search Report mailed Oct. 15, 2012 for Application No. 12171124.6.
English Translation of Office Action (First Office Action) issued on Dec. 3, 2015, by the Chinese Patent Office in corresponding Chinese Patent Application No. 201380029716.8. (9 pages).

* cited by examiner

ACTUATOR FOR A VALVE AND A VALVE COMPRISING SUCH ACTUATOR

TECHNICAL FIELD

The invention relates to an actuator for a valve and a valve comprising such actuator.

BACKGROUND

Valves, and especially sample valves may be used to simplify the extraction of samples from e.g. tanks, reactors and pipelines. Generally, a sample valve comprises a sample fluid inlet, a fluid outlet, a cleaning fluid inlet, a valve seat and an actuator arranged to set the valve to control a flow between the inlets and the outlet.

Especially in the food industry, there are strict requirements regarding the cleaning possibility of all surfaces that have been exposed to a product. Cleaning may be accomplished by hot steam being injected through the valve from the cleaning fluid inlet, past the valve seat and to the fluid outlet when the sample fluid inlet is closed off.

The operation of a sample valve requires a movement of one or several pistons arranged in the actuator of the valve, together or independently of each other, typically depending on an operation cycle. An operation cycle comprises essentially a closed position, an open position and a cleaning position. In the closed position, often referred to as a default position, any flow out of the sample fluid inlet is prevented. In the open position, the sample fluid inlet is open, allowing a sample fluid to be collected via the fluid outlet. In the cleaning position, a portion of the valve seat is exposed to allow cleaning thereof while any sample flow from the sample fluid inlet is still closed off. In the closed position, the portion of the valve seat that is exposed in the cleaning position is in direct or indirect contact with a piston that forms part of the actuator and/or is in contact with a sealing membrane that covers a part of the piston. By, in the cleaning position, exposing a part of the valve seat, residues may be removed by a flow of cleaning fluid supplied at the cleaning fluid inlet and flowing over the exposed part.

For effecting such cleaning it is known to provide the actuator with coaxially arranged, dual piston rods. The operation of the dual piston rods is controlled via three fluid supply inlets. This affects the complexity of the actuator and also the costs for manufacturing and maintenance.

The same problem is true for other types of valves as well, i.e. there is a general need for reducing complexity of and costs for manufacturing and maintaining a valve actuator, and in particular an actuator where one piston rod is coaxially arranged with another piston rod.

SUMMARY

An object of the invention is to provide a valve actuator with a more simple design that allows costs to be reduced. Another object is to provide a valve that employs such simplified actuator.

This is achieved by means of an actuator for a valve, comprising a first piston comprising a first piston rod, a first fluid chamber for the first piston, for enabling movement of the first piston and the first piston rod when fluid is introduced into the first fluid chamber, a second piston comprising a second piston rod, the second piston rod being coaxially arranged with the first piston rod and radially enclosing at least a part of the first piston rod, a second fluid chamber for the second piston, for enabling movement of the second piston and the second piston rod when fluid is introduced into the second fluid chamber. The actuator is characterized by a fluid channel in communication with each of the first and the second fluid chambers, for effecting, when fluid is introduced into the first fluid channel, and thereby also introduced into the first and the second fluid chambers, movement of the first piston and movement of the second piston.

By the two fluid chambers being in communication with one and the same fluid channel, the operation of the first and the second pistons may be controlled by one and the same fluid supply while allowing the two piston rods to operate in same or opposite directions. This allows a simplified solution involving fewer components and thereby a reduced overall cost. In one embodiment the first piston is moved in a first direction while the second piston is moved in a second direction that is opposite the first direction. In another embodiment the first and second pistons are moved in the same direction. The first fluid channel may comprise only one fluid supply inlet.

The first fluid chamber may be defined by the first piston and a driver, the driver being slidably arranged in a housing of the actuator. The driver may be used to convert a movement generated by a piston other than the first piston to a movement of the first piston and its piston rod in view of the housing. During such movement, no relative movement will take place between the driver and the first piston. This allows for a reduced number of components and thereby a smaller actuator.

The actuator may further comprise a first elastic means arranged on a piston rod side of the first piston, wherein the first elastic means may be arranged to counteract the movement of the first piston, which movement corresponds to an extension or protraction of the first piston rod. The term "extension" should be understood as a relative movement of the piston rod in view of the housing, in a direction out from or away from the housing.

By the movement being counteracted by an elastic means, a supply of fluid to the first fluid chamber (or to a third fluid chamber, described below) is required in order to move the first piston.

The first elastic means may be a compression spring arranged to act between the piston rod side of the first piston and a cap end side of the second piston.

The actuator may further comprise a second elastic means arranged on a cap end side of the second piston, wherein the second elastic means is arranged to counteract the movement of the second piston.

By the movement of the second piston being counteracted by an elastic means, a supply of fluid to the second fluid chamber (or to a third fluid chamber, described below) is required in order to move the second piston. Since the first and the second fluid chambers are communicating with each other via the fluid channel, a fluid supply to one of the fluid chambers will automatically result in a fluid supply to the other fluid chamber.

The second elastic means may be a compression spring arranged to act between the cap end side of the second piston and a portion of the driver.

The actuator may further comprise a third piston, and a third fluid chamber for the third piston, for enabling movement of the third piston when fluid is introduced into the third fluid chamber, and a fluid supply inlet for the third fluid chamber for effecting movement of the third piston when fluid is introduced into the third fluid chamber via the fluid supply inlet, whereby the third piston is arranged to move the second piston and the first piston together in a same direction.

The third piston may typically be arranged to move the first and the second pistons and their respective piston rods to a retracted position.

The third piston may be positioned on the piston rod side of the first and the second pistons.

The actuator may further comprise a third elastic means arranged between a wall portion on a cap end side of the housing and a wall portion on a cap end side of the driver.

The default position of the actuator will be the closed position of a valve that is controlled by the actuator, since the third elastic means by the driver may operate the first and the second pistons and their respective piston rods together to an extended position of the two piston rods. During this operation, there is typically no relative movement between the first and the second pistons.

By virtue of the third elastic means, a pressurized fluid must be supplied to the third fluid chamber for opening a valve that is controlled by the actuator.

The third elastic means may be arranged to be compressed as the first piston is moved together with the second piston.

The first piston may have a piston face area facing the first fluid chamber, and the second piston may have a piston face area facing the second fluid chamber, a first actuation force may be required to be applied by the fluid to the piston face area of the first piston in order to move the first piston in a first direction to an extended end position, and a second actuation force may be required to be applied by the fluid to the piston face area of the second piston in order to move the second piston in a second direction to a retracted end position, and wherein the required first actuation force is smaller than the required second actuation force, such that the first piston will be moved to the extended end position before the second piston will be moved to the retracted end position.

Such movement of the pistons may be accomplished by dimensioning the first and the second pistons and the first and second elastic means respectively so that the first required actuation force is lower than the second required actuation force. Then, by the first and the second fluid chambers being arranged in communication with each other and being supplied with a fluid having the same fluid pressure, the first piston will automatically move before the second piston.

According to another aspect, the invention relates to a valve, comprising an actuator with the above given features, a sample fluid inlet, a fluid outlet, a cleaning fluid inlet, a valve seat and a membrane, the membrane being operable to sealingly engage the valve seat by means of the first and the second piston rods of the actuator, whereby the actuator is arranged to control a flow of sample fluid from the sample fluid inlet to the fluid outlet and to control a flow of cleaning fluid from the cleaning fluid inlet to the fluid outlet while closing off any flow of sample fluid from the sample fluid inlet.

The valve may be connected to e.g. a tank, a receptor and a pipeline in order to be able to allow a sample to be taken there from.

The actuator may be arranged in the sample valve to operate the first piston rod and the second piston rod between i) a closed position in which a front edge portion of the first piston rod and a front edge portion of the second piston rod are set to operate the membrane to engage the valve seat to sealingly close off any flow of sample fluid from the sample fluid inlet to the fluid outlet, ii) an open position in which the front edge portion of the first piston rod and the front edge portion of the second piston rod are set to operate the membrane to allow a flow of sample fluid from the sample fluid inlet to the fluid outlet, and iii) a cleaning position in which the front edge portion of the first piston rod is set to operate the membrane to engage the valve seat to sealingly close off any flow of sample fluid from the sample fluid inlet to the sample flow outlet, while at the same time the front edge portion of the second piston rod is retracted such that a portion of the valve seat is exposed and a cleaning fluid thereby may flow from the cleaning fluid inlet, over the exposed portion and to the fluid outlet.

According to another aspect, a method of operating the valve is provided.

Further objects and features will be apparent from the detailed description and the claims. In particular, the actuator is not limited for operation of a sample valve.

DRAWINGS

An embodiment of the invention will now be described, by way of example, in more detail with reference to the appended drawings in which:

FIG. 1 is a schematic cross-sectional view of a valve with an actuator that sets the valve in a closed position.

Figure 2:
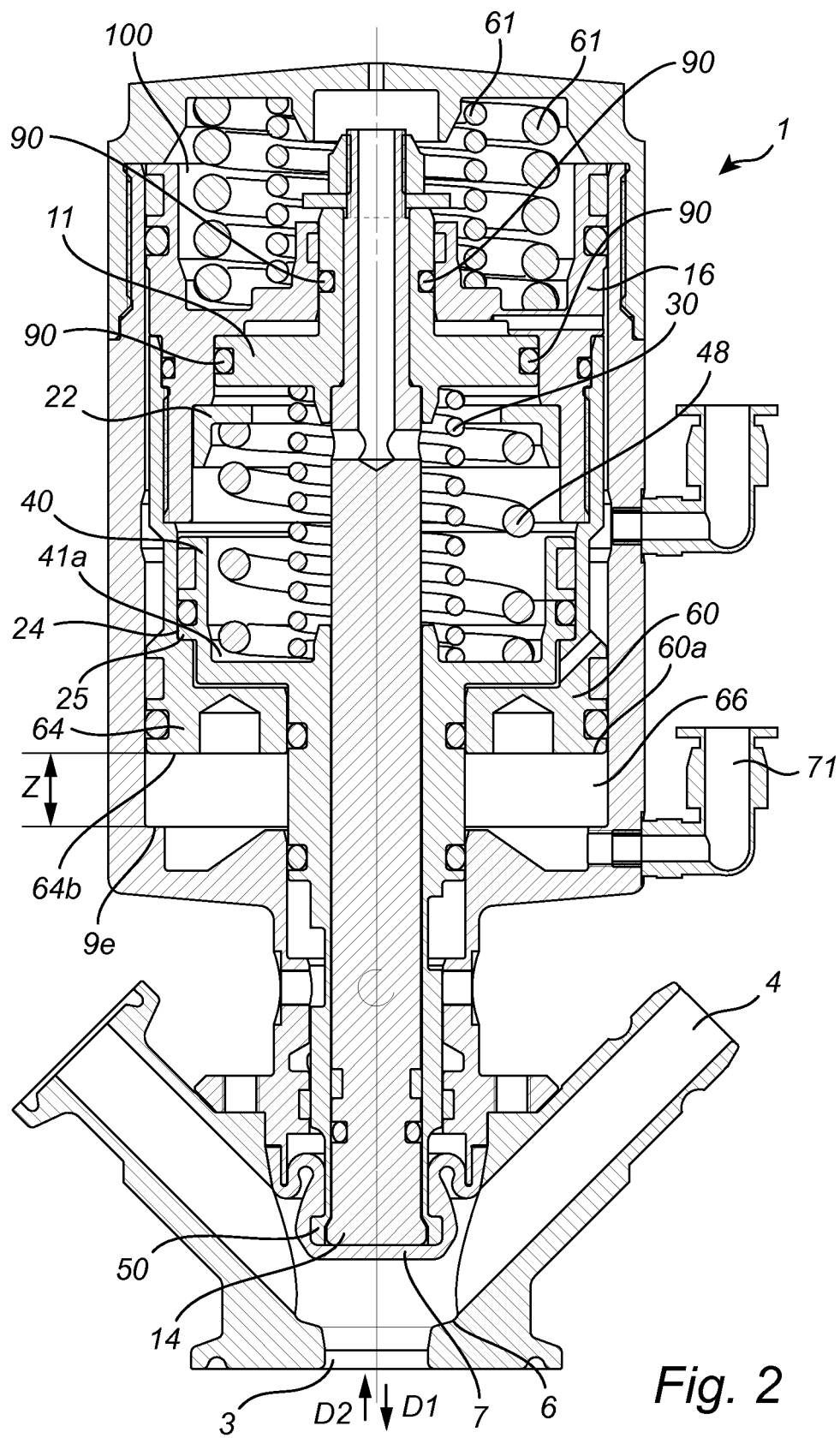

FIG. 2 discloses the valve of FIG. 1 when set in an open position.

Figure 3:
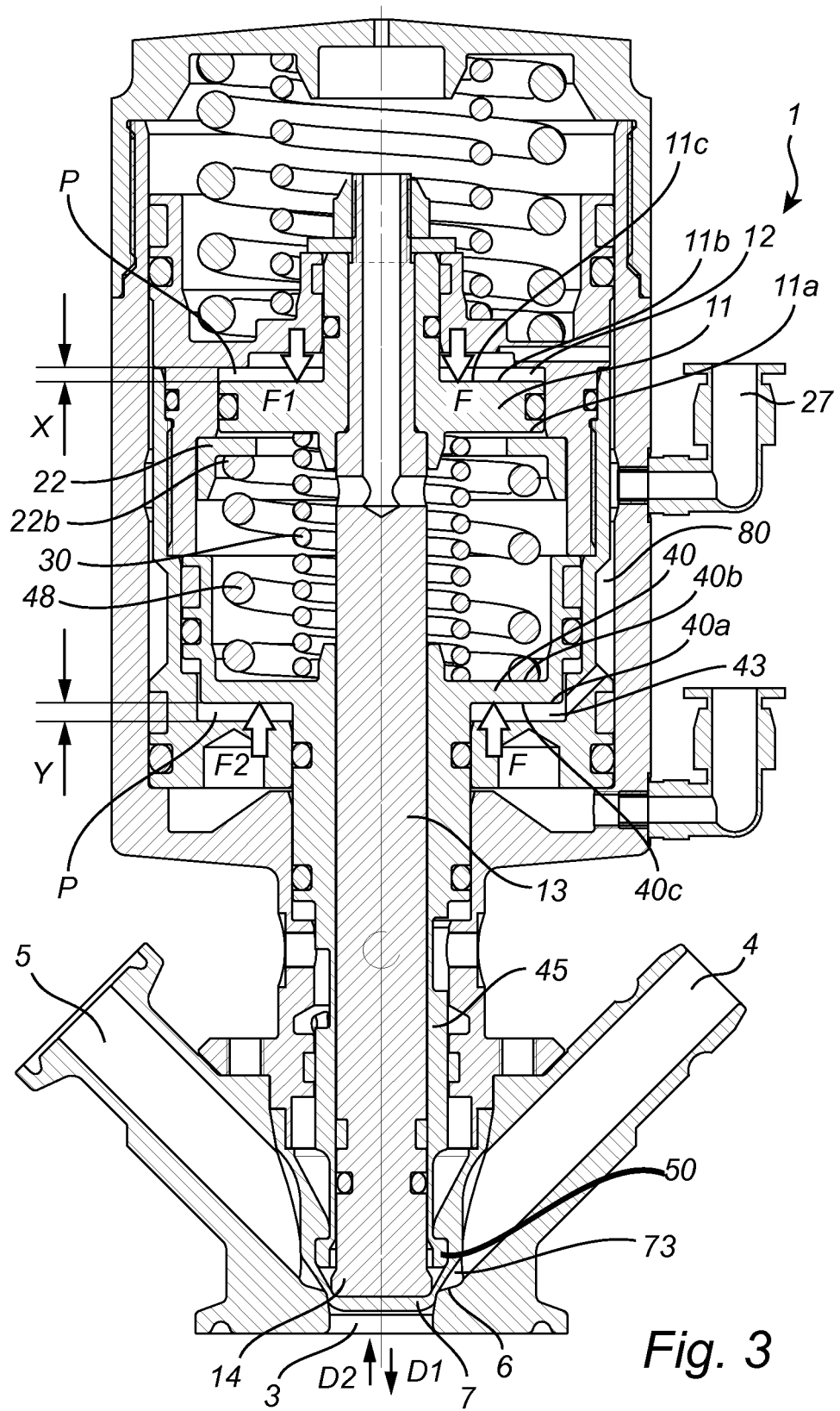

FIG. 3 discloses the valve of FIG. 1 when set in a cleaning position.

Figure 4:
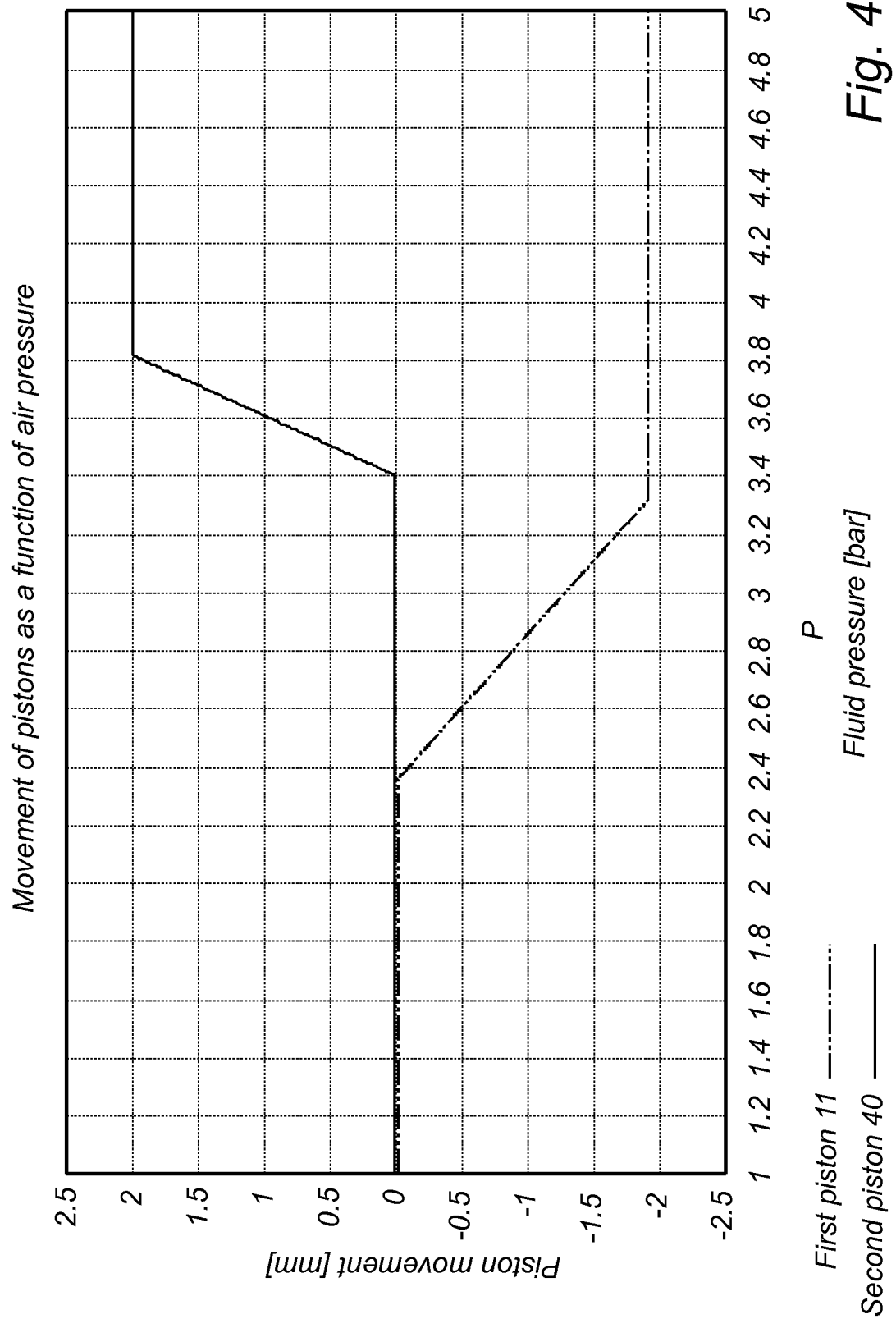

FIG. 4 discloses one example of a movement of first and second pistons of the actuator, as a function of a fluid pressure.

Figure 5:
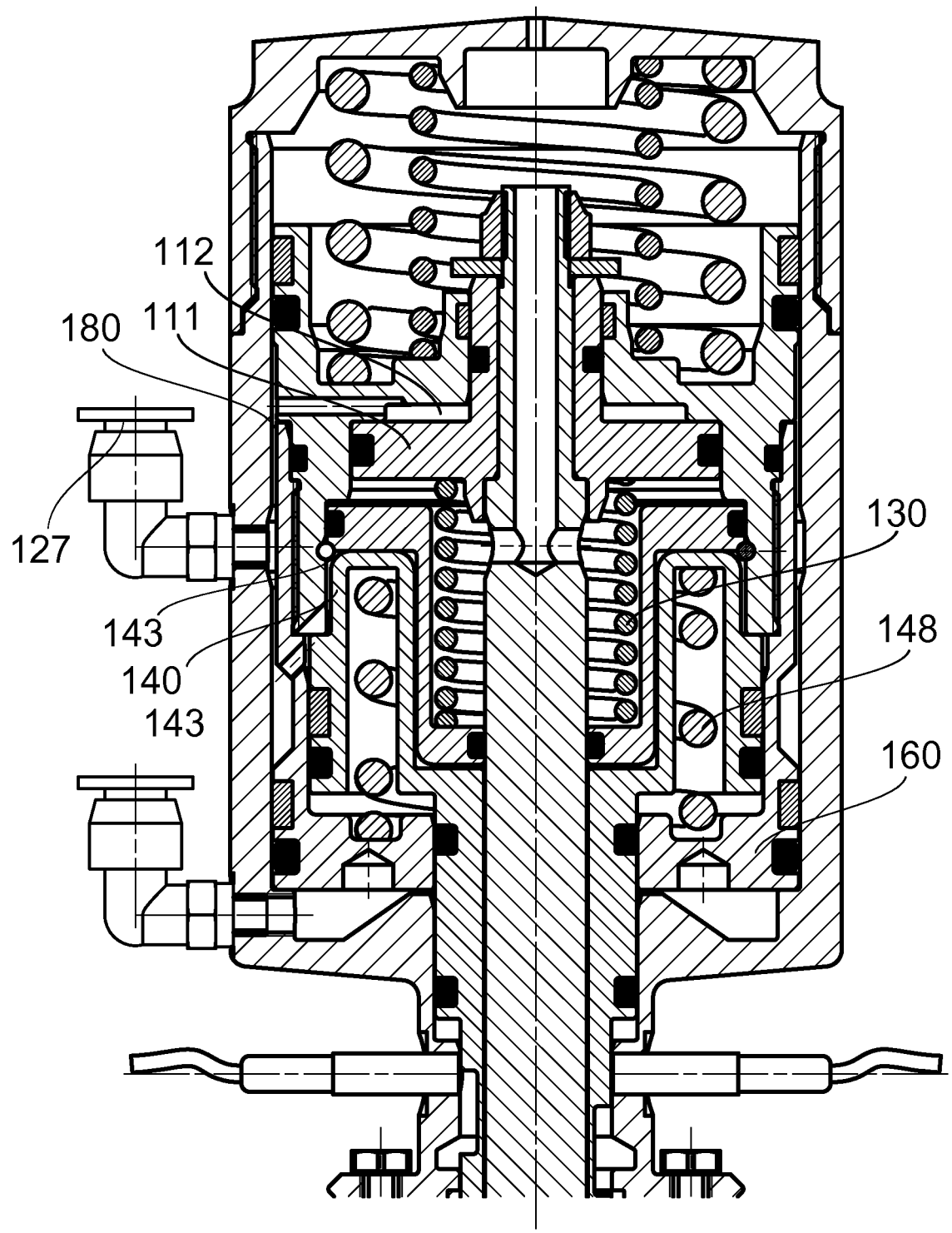

FIG. 5 discloses another embodiment of a valve actuator.

DETAILED DESCRIPTION

FIG. 1 is a schematic cross sectional view illustrating a valve 2 with an actuator 1. The cross section is taken along a longitudinal central axis CA of the actuator 1.

The actuator 1 is forming part of the valve 2, which comprises a sample fluid inlet 3, a fluid outlet 4, a cleaning fluid inlet 5, a valve seat 6 and a membrane 7. The membrane 7 is operable to sealingly engage the valve seat 6 by means of the actuator 1. Thus, the actuator 1 is arranged to control a flow of sample fluid from the sample fluid inlet 3 to the fluid outlet 4. The actuator also controls how a flow of cleaning fluid from the cleaning fluid inlet 5 flows past the valve seat 6 and to the fluid outlet 4, while closing off any flow of sample fluid from the sample fluid inlet 3.

The actuator 1 is in FIG. 1 disclosed in its closed position which also is referred to as a default position, closing off any flow from the sample fluid inlet 3.

To facilitate the description and the understanding of individual features and movements, the terms front end and rear end will be used. By front end is to be understood an end of the actuator 1 intended to face the valve seat 6 during use, i.e. the front end may be seen as an end of the actuator 1 that is closest to the valve seat 6. The rear end, also referred to as the cap end side, refers to an end of the actuator 1 intended to face away from the valve seat 6 during use, i.e. the rear end may be seen as an end of the actuator 1 that is furthest away from the valve seat 6.

Further, the term piston rod side is used. This term refers to the side of a piston from which a piston rod extends.

To describe a movement of the piston rods, the terms extended position and retracted position are used. The extension will take place in a first direction D1, while the retraction will take place in a second direction D2. The term extension should be understood as a movement of the piston rod out from the housing, i.e. a protraction.

The actuator 1 comprises a housing 9. The housing 9 is divided into a rear part 9a and a front part 9b. The front part 9b has a protruding section 10 that is connected to a valve body 32 that forms the sample fluid inlet 3, the fluid outlet 4, the cleaning fluid inlet 5 and the valve seat 6.

The actuator 1 comprises a first piston 11 received in a first fluid chamber 12. The first piston 11 comprises a first piston rod 13. The first piston 11 and the first piston rod 13 may be formed as one integral unit or as two or more interconnected parts.

The first piston rod 13 is arranged to extend parallel to the central axis CA, with a front end edge portion 14 extending outside the housing 9.

The first piston 11 and the first piston rod 13 both have a circular cross section although it is to be understood that other cross sectional shapes may be used.

The first fluid chamber 12 is defined by a driver 16 arranged to be axially movable inside the housing 9, or more specifically inside the front part 9b of the housing, during operation of the actuator 1.

In the disclosed embodiment the driver 16 has a tubular, longitudinal shape having a diametrical partition wall 17 with a through opening 18 receiving the first piston 11 and the first piston rod 13.

Inner longitudinal wall portions 17d on the piston rod side 17a of the partition wall 17 have a stepped geometry. A first step surface 19 forms a seating for the first piston 11 restricting the retraction of the first piston 11, i.e. its movement in the second direction D2.

A nut 75 connects a washer 76 to an upper end of the first piston rod 13. The partition wall 17, which is part of the driver 16, has an upper abutment surface 77. In the closed position shown in FIG. 1 there is a distance between the washer 76 and the abutment surface 77. The first piston 11 is movable inside the first fluid chamber 12, whereby a stroke length X of the first piston rod 13 relative the driver 16 and a third piston 60 that is connected to the driver 16 is determined by the distance between the washer 76 and the abutment surface 77.

A compartment 100 is located in the actuator 1. One or more elastic means (in the FIG. two) 61 are arranged to cooperate with the third piston 60, which is fixedly connected to the driver 16. These elastic means 61 will in the following be referred to as the third elastic means 61.

The driver 16 is slidingly arranged in relation to the inner longitudinal walls of the housing 9.

The first fluid chamber 12 is communicating with a first fluid supply inlet 27 via a fluid channel 80. The fluid channel 80 comprises a through channel 28 that is arranged in the longitudinal wall of the driver 16.

The actuator 1 comprises a second piston 40 comprising a second piston rod 45 arranged on a piston rod side 11a of the first piston 11. The second piston 40 has the shape of a tubular body having a bottom wall 41. The second piston 40 forms a peripheral cap end edge portion 42 facing the piston rod side 11a of the first piston 11.

The second piston 40 is received in a second fluid chamber 43, i.e. it may be said that the actuator 1 has a second fluid chamber 43 for the second piston 40. The second fluid chamber 43 is located between the second piston 40 and the third piston 60.

The second piston 40 is movable in the first and the second directions D1, D2. A stroke length Y of the second piston 40 and its piston rod 45 relative the driver 16 and the third piston 60 is determined by the distance between a peripheral piston rod side edge portion 30 of the driver 16 and the peripheral cap end edge portion 42 of the second piston 40.

The second fluid chamber 43 is communicating with the first fluid supply inlet 27 via a channel 65 in a the third piston 60. The channel 65 forms part of the fluid channel 80.

The second piston rod 45 extends along a portion of the first piston rod 13. The second piston 40 and the second piston rod 45 may be formed as one unit or as two interconnected parts. The second piston rod 45 is coaxially arranged with the first piston rod 13 and radially encloses at least a part of the first piston rod 13.

The second piston 40 and the second piston rod 45 have circular cross sections although it is to be understood that other cross sections may be used. The inner diameter of the second piston rod 45 slightly exceeds the outer diameter of the first piston rod 13, such that they are axially movable relative each other in directions D1 and D2.

The second piston rod 45 has a front end portion 50. In the illustrated embodiment the front end portion 50 has a recess 47 arranged to cooperate with a corresponding radial protrusion 25 that is arranged on the first piston rod 13. The protrusion 25 of the first piston rod 13 may act as a drive when the two pistons rods 13, 45 are operated, i.e. when the first piston rod 13 is moved in the second direction D2 to its retracted position, it may drive the second piston rod 45 along in the same direction. However, when moving the first piston 13 in the first direction D1, the second piston rod 45 will not follow. The recess 47 and the protrusion 25 are optional.

The first piston 11 is arranged to cooperate with a first elastic means 30. The first elastic means 30 is coaxially arranged around a part of the first piston rod 13. In the disclosed embodiment the first elastic means 30 is a spring, e.g. in the form of a compression spring arranged to act with a pre-compression between the piston rod side 11a of the first piston 11 and a cap end side 41a of the second piston 40.

The second piston 40 is arranged to cooperate with a second elastic means 48. The second elastic means 48 is coaxially arranged around a part of the first piston rod 13. In the disclosed embodiment the second elastic means 48 is a spring, e.g. in the form of a compression spring. The second elastic means 48 is arranged to act with a pre-compression between a piston rod side 22b of an anvil 22 of the driver 16 and the cap end side 41a of the bottom wall 41 of the second piston 40. It is possible to configure the driver 16 such that the second elastic means 48 acts between the driver 16 and the cap end side 41a. The use of the anvil 22 is optional and typically depends on the size of the actuator 1.

The third piston 60 is arranged mainly on the piston rod sides 11a, 40a of the first and second pistons 11, 40. The third piston 60 is received in a third fluid chamber 66, i.e. it may be said that the actuator 1 has a third fluid chamber 66 for the third piston 60.

The third piston 60 has the shape of a tubular body with a bottom wall 64. As mentioned, the third piston 60 is connected to the driver 16, typically via threads on each of the components. A longitudinal side wall 68 of the third piston 60 extends to enclose an outer longitudinal wall 49 of the second piston 40 and a part of a longitudinal wall of the driver 16 (at a location of the threads that connect the third piston to the driver).

The inner wall of the third piston 60 has a stepped geometry engaging corresponding steps 51 formed on the outer longitudinal wall 49 of the second piston 40.

An outer longitudinal wall portion 68b of the third piston 60 acts as a guiding surface, cooperating with an inner longitudinal wall portion of the housing 9.

The third piston 60 is received in the third fluid chamber 66. The third fluid chamber 66 is defined by a section of the inner side wall of the housing 9 and a front end side 64b of the bottom wall 64 of the third piston 60.

The third piston 60 has a stroke length Z that is defined by a distance between an inner rear wall 9c of the housing 9 and a peripheral end side 17c of the driver 16. The stroke length Z is also illustrated in FIG. 2 as defined between the inner front wall 9e of the housing 9 and the front end side 64b of the bottom wall 64.

The third piston 60 is arranged to cooperate with the third elastic means 61. In the disclosed embodiment two elastic means are used. The third elastic means 61 are arranged to act between the inner rear wall 9d of the housing 9 and the cap end side 17b of the partition wall 17 of the driver 16. The third elastic means 61 are arranged with a pre-compression between these two surfaces. In the disclosed embodiment, the third elastic means 61 are made up by two coaxially arranged compression springs. It is to be understood that only one or even more than two elastic means may be used depending on the available space in the rear end of the housing 9.

A lower portion of the longitudinal side wall 68 of the third piston 60 comprises the channel 65. The channel 65 extends between the second fluid chamber 43 and a first fluid channel 80 formed between the inner longitudinal wall portion of the housing 9 and the outer longitudinal wall portion 68b of the third piston 60. This first fluid channel 80 is communicating with the first fluid supply inlet 27. The first and the second fluid chambers 12, 43 are communicating with each other via this first fluid channel 80.

The first fluid supply inlet 27 is arranged to operate the first and the second pistons 11, 40 by supplying a fluid to the first and second fluid chambers 12, 43 respectively. The supplied fluid will operate the first piston 11 in the first direction D1, while operating the second piston 40 in the opposite, second direction D2.

A second fluid supply inlet 71 is arranged to operate the third piston 60 by means of the third fluid chamber 66. The second fluid supply inlet 71 will operate the third piston 60 in the second direction D2.

The fluid supply inlets 27, 71 are arranged to be connected to one or two non-disclosed fluid sources providing a pressurized fluid.

In the following, the operation of the above described actuator 1 will be discussed. The actuator 1, when forming part of a valve 2, is arranged to set the valve 2 by means of the first and second piston rods 13, 45 between a closed position, an open position and a cleaning position. The three positions refer to the engagement between the valve seat 6 and the front end edge portion 14 of the first piston rod 13 and the front edge portion 50 of the second piston rod 45. In the disclosed embodiment, the membrane 7 is arranged between the valve seat 6 and the front edge portions 14, 50 of the two pistons rods 13, 45.

Starting with FIG. 1, the actuator 1 is set to the closed position being the default position. In this position, the first and the second piston rods 13, 45 are both positioned with their front end edge portions 14, 50 acting on the membrane 7 which in turn acts sealingly against the valve seat 6. In this position, the membrane 7 is preferably stretched to some degree by means of the two piston rods 13, 45 acting thereon.

The first and the second piston rods 13, 45 are brought to this position by the pre-compression of the third elastic means 61. The third elastic means 61 is arranged to act with a pre-compression between the inner rear wall 9d of the housing 9 and a cap end side 17b of the partition wall 17 of the driver 16. By the pre-compression, the third elastic means 61 applies a pressure in the first direction D1 to the driver 16. The driver 16 thereby forces, by its connection to the third piston 60, the third piston 60 towards the inner front end wall 9e of the housing 9. The movement corresponds to the stroke length Z of the third piston 60.

By the first elastic means 30 being pre-compressed to act between a cap end side 40b of the second piston 40 and the piston rod side 11a of the first piston 11, the first piston 11 is pressed towards and abutting the piston rod side 17a of the partition wall 17 of the driver 16.

The first piston 11 and the second piston 40 are moved the distance Z when the third piston 60 moves the distance Z. This is accomplished by the third piston 60 abutting the second piston 40 at steps 51 and by the pre-compression of the first elastic means 30 that "lifts" the first piston 11 when the second piston 40 is lifted. Thereby the first piston 11 and the first piston rod 13 may move along with the third piston 60 and the driver 16 a distance corresponding to the stroke length Z of the third piston 60.

By the third elastic means 61 being a pre-compressed elastic means, it will by default set the actuator 1 to this closed position if no fluid supply is provided to the third fluid chamber 66. Thus, it is safe guarded that the sample fluid inlet 3 is closed even in case of a power failure.

It is to be understood that depending on how a supply of cleaning fluid from the cleaning fluid inlet 5 is operated, a flow of cleaning fluid from the cleaning fluid inlet 5 to the fluid outlet 4 may be permitted while the sample fluid inlet 3 is closed off.

Now turning to FIG. 2, the actuator 1 is disclosed in its open position. In this position a flow is permitted from the sample fluid inlet 3 to the fluid outlet 4.

In order to set the actuator 1 to this position, a pressurized fluid is supplied to the third fluid chamber 66 via the second fluid supply inlet 71. A fluid pressure P supplied by such pressurized fluid should be sufficiently high to counteract the pre-compression of the third elastic means 61 and cause the third piston 60 to move a distance corresponding to its stroke length Z in the second direction D2.

The supplied fluid will act on a front side surface 60a of the third piston 60 causing the third piston 60 to move a distance corresponding to its stroke length Z. The third piston 60 will force the driver 16 to move along the same distance. No relative movement between the third piston 60 and the driver 16 will take place. Also, no relative movement will take place between the first and the second pistons 11, 40 when setting the actuator 1 to the open position.

Accordingly, during the movement of the third piston 60, the front end edge portions 14, 50 of the first and the second piston rods 13, 45 will be retracted the same distance Z, releasing their sealing engagement with the valve seat 6. The sealing engagement will be arranged via the membrane 7. The membrane 7 will spring back accordingly. A free passage between the sample fluid inlet 3 and the fluid outlet 4 is hence provided.

No turning to FIG. 3, the cleaning position of the actuator 1 will be described. Starting from the closed position of FIG. 1, a pressurized fluid is supplied to the first and the second fluid chambers 12, 43 via the first fluid supply inlet 27. Since the two fluid chambers 12, 43 are communicating via the first fluid channel 80, both chambers will be supplied with the same fluid pressure P. As a result of the fluid pressure P, both the first and the second pistons 11, 40 will be operated, however in opposite directions. The first piston 11 will be operated to extend the first piston rod 13 in the first direction D1. The second piston 40 will be operated to retract the second piston rod 45 in the second direction D2.

Starting with the first piston 11, this will be operated by the fluid pressure P as follows. The fluid supplied to the first fluid chamber 12 will exert a fluid pressure P to the cap end side 11b of the first piston 11. This fluid pressure P will be transmitted to the first elastic means 30 arranged to act between the piston rod side 11a of the first piston 11 and the cap end side 40b of the second piston 40. Provided the fluid pressure P is sufficiently high to deform the first elastic means 30, the first elastic means 30 will be compressed, thereby moving the first piston a distance corresponding to its stroke length X. In this position, the first piston 11 is in its extended end position. Accordingly, the front end edge portion 14 of the first piston 11 will move the corresponding distance, to an even closer engagement with the membrane 7 and the valve seat 6. By the first piston rod 13 having a smaller diameter than the second piston rod 45, the front end edge portion 14 of the first piston rod 45 may extend into sample fluid inlet 3 while closing off any flow from the sample fluid inlet.

On the other hand, the fluid supplied to the second fluid chamber 43 will exert a fluid pressure P to the piston rod side 40a of the second piston 40. This fluid pressure P will be transmitted to the second elastic means 48 arranged to act between the cap end side 40b of the second piston 40 and the piston rod side 22b of the anvil 22. Provided the fluid pressure P is sufficiently high to deform the second elastic means 48, the second elastic means will be compressed, thereby moving the second piston 40 a distance corresponding to its stroke length Y. In this position, the second piston 40 is in its retracted end position. The second piston rod 45 will thus be retracted in the second direction D2, whereby the front end edge portion 50 of the second piston rod 45 will loosen its engagement with the membrane 7 which will spring back and expose a portion 73 of the valve seat 6. A flow of cleaning liquid may then be permitted between the cleaning fluid inlet 5 and the fluid outlet 4 for allowing cleaning of the thus resulting exposed portion 73 of the valve seat 6. Any residues trapped in this portion 73 may thereby be removed by the cleaning fluid. Thereby the portion 73 may be cleaned.

Generally, the relationship between fluid pressure P and required actuation force F is defined as P=F/A, where A is a piston face area like areas 11c, 40c, i.e. the area of the first and the second pistons 11, 40 respectively subjected to the fluid pressure P. The required actuation force F is the force required to move the first or the second pistons 11, 40 respectively a distance corresponding to their stroke lengths X and Y.

The required actuation force F is determined as $F=c*(L_1+L_2)$, where c is the spring constant of the elastic means, and where $L_1$ is an initial pre-compression length of an elastic means and $L_2$ is a required piston movement received by further compressing the elastic means by applying the fluid pressure P. $L_2$ equals the stroke length X or Y.

By the first and the second fluid chambers 12, 43 being supplied with the same fluid pressure P, the operation order of the first and the second pistons 11, 40, i.e. which of the first and the second pistons 11, 40 that will be moved first, is a matter of dimensioning the piston face areas 11c, 40c of the first and the second pistons 11, 40 and dimensioning the first and second elastic means 30, 48. The first and second elastic means 30, 48 are dimensioned by selecting an elastic means having a predetermined spring constant c, the pre-compression $L_1$ when the selected elastic means is mounted in the actuator and the stroke length X, Y of the piston intended to be operated by the elastic means.

To safe guard a controlled closing off of the first sample fluid inlet 3, the first piston 11 should be moved first to its extended end position, i.e. stroke length X, before the second piston 40 should move to its retracted end position, i.e. stroke length Y. This is illustrated by FIG. 4 showing one embodiment wherein the piston movements of the first and second pistons 11, 40 are disclosed as a function of the fluid pressure. From FIG. 4, it is clearly illustrated that the first piston 11 will move in the first direction D1 to its extended end position before the second piston 40 will start moving in the second direction D2, being opposite the first direction D1, to its retracted end position.

When the cleaning is finished, the fluid pressure P supplied to the first fluid supply inlet 27 may be released. Thereby the stored energy in the first and the second elastic means 30, 48 will reset the first and the second pistons 11, 40 to their initial positions, i.e. to the positions shown in FIG. 1. The first piston 11 will then move in the second direction D2, while the second piston 40 will move in the first direction D1.

The elastic means 30, 48, 61 have been disclosed and described as compression springs being coaxially arranged with coinciding axis. It is tough to be understood that other types of elastic means may be used. It is also to be understood that other positions than coaxial may be used. By way of example a plurality of elastic means, such as leaf springs or elastic cushions, may be symmetrically arranged with remained function.

It is also to be understood that the number of coaxially arranged elastic means 30, 48, 61 may be varied depending on the available space. In the disclosed embodiment, the third elastic means 61 is comprised by two coaxially arranged compression springs. These may be replaced by one single, more powerful elastic means or with more than two, less powerful elastic means.

Further, it is to be understood that the power of the elastic means is determined by factors such as the fluid pressure and friction.

It is to be understood that the driver 16, pistons 11, 40, 60 and piston rods 13, 45 may be designed in a number of ways while retaining their function. This is especially the case regarding engaging surfaces of the driver 16, the pistons 11, 40, 60 and the elastic means 30, 48, 61.

The actuator 1 comprises a number of sliding surfaces between interacting movable components. To reduce the friction, at least some of them may be provided with any friction reducing means, such as slide bearings or a surface treatment. Friction reduction is well known to the skilled person whereby this is not further discussed.

To ensure no fluid leakage from the fluid chambers 12, 43, 66 these are provided with sealings. For illustration purposes, sealings 90 relating to the first fluid chamber 12 are illustrated in FIG. 2. This is well known to the skilled person and thereby not further discussed.

The actuator may be pneumatic or hydraulic, whereby the fluid may be either a pressurized gas such as air or a pressurized liquid fluid.

The membrane 7 is preferably a one piece member made of a flexible material such as rubber or plastics. It is to be understood that the membrane 7 may have a number of designs and positions, i.e. the disclosed geometry and design is only one out of many possible.

It is to be understood that the disclosed valve 2 is only one possible embodiment.

The valve 2 has been exemplified and disclosed as a sample valve with the valve 2 having a sample fluid inlet 3, a fluid outlet 4 and a cleaning fluid inlet 5. However, it is to be understood that the actuator 1 is applicable to valves in general. For example, with reference to FIG. 5, it is possible to move a first piston 111 and a second piston 130 in the same direction when pressure is supplied to a first fluid chamber 112 and a second fluid chamber 143, via one fluid channel 180 in communication with each of the first and the second fluid chambers 112, 143. The pressure is fed to the fluid channel 180 via a single fluid inlet 127. As before, areas of the pistons 111, 130 and spring constants of springs 130, 148 that counteract forces generated by the supplied pressure may be selected such that the first piston 111 moves to an end position of the first piston 111, before the second piston 130 starts moving towards and end position of the second piston 130. The first piston 111 and second piston 130 may together be lifted by supplying a pressure on a third piston 160.

Thus, it will be appreciated that numerous variants of the above described embodiments of the present invention are possible within the scope of the appended claims.

The invention claimed is:

1. An actuator for a valve, comprising:
a first piston comprising a first piston rod,
a first fluid chamber for the first piston, for enabling movement of the first piston and the first piston rod when fluid is introduced into the first fluid chamber,
a second piston comprising a second piston rod, the second piston rod being coaxially arranged with the first piston rod and radially enclosing at least a part of the first piston rod,
a second fluid chamber for the second piston, for enabling movement of the second piston and the second piston rod when fluid is introduced into the second fluid chamber,
a first fluid channel in communication with each of the first and the second fluid chambers, for effecting, when fluid is introduced into the first fluid channel and thereby also introduced into the first and the second fluid chambers, movement of the first piston and movement of the second piston, and
the first fluid chamber being defined by the first piston and a driver, the driver being slidably arranged in a housing of the actuator.

2. The actuator according to claim 1, wherein the first fluid channel comprises only one fluid supply inlet.

3. The actuator according to claim 1, further comprising:
a first elastic means arranged on a piston rod side of the first piston, wherein the first elastic means is arranged to counteract the movement of the first piston, which movement corresponds to an extension of the first piston rod.

4. The actuator according to claim 3, wherein the first elastic means is a compression spring arranged to act between the piston rod side of the first piston and a cap end side of the second piston.

5. The actuator according to claim 1, further comprising:
a second elastic means arranged on a cap end side of the second piston, wherein the second elastic means is arranged to counteract the movement of the second piston.

6. The actuator according to claim 5, wherein the second elastic means is a compression spring arranged to act between the cap end side of the second piston and a portion of the driver.

7. The actuator according to claim 1, further comprising:
a third piston, and a third fluid chamber for the third piston, for enabling movement of the third piston when fluid is introduced into the third fluid chamber, and
a fluid supply inlet for the third fluid chamber for effecting movement of the third piston when fluid is introduced into the third fluid chamber via the fluid supply inlet, whereby
the third piston is arranged to move the second piston and the first piston together in a same direction.

8. The actuator according to claim 7, wherein the third piston is positioned on the piston rod sides of the first and the second pistons.

9. The actuator according to claim 1, further comprising:
a third elastic means arranged between a wall portion on a cap end side of the housing and a wall portion on a cap end side of the driver.

10. The actuator according to claim 9, wherein the third elastic means is arranged to be compressed as the first piston is moved together with the second piston.

11. The actuator according to claim 1, wherein the first piston has a piston face area facing the first fluid chamber, and the second piston has a piston face area facing the second fluid chamber,
a first actuation force is required to be applied by the fluid to the piston face area of the first piston in order to move the first piston in a first direction to an extended end position, and a second actuation force is required to be applied by the fluid to the piston face area of the second piston in order to move the second piston in a second direction to a retracted end position, and wherein
the required first actuation force is smaller than the required second actuation force, such that the first piston will be moved to the extended end position before the second piston will be moved to the retracted end position.

12. A valve, comprising an actuator according to claim 1, a sample fluid inlet, a fluid outlet, a cleaning fluid inlet, a valve seat and a membrane, the membrane being operable to sealingly engage the valve seat by means of the first and the second piston rods of the actuator,
whereby the actuator is arranged to control a flow of sample fluid from the sample fluid inlet to the fluid outlet and to control a flow of cleaning fluid from the cleaning fluid inlet to the fluid outlet while closing off any flow of sample fluid from the sample fluid inlet.

13. The valve according to claim 12, in which the actuator is arranged to operate the first piston rod and the second piston rod between a closed position in which a front edge portion of the first piston rod and a front edge portion of the second piston rod are set to operate the membrane to engage the valve seat to sealingly close off any flow of sample fluid from the sample fluid inlet to the fluid outlet,
an open position in which the front edge portion of the first piston rod and the front edge portion of the second piston rod are set to operate the membrane to allow a flow of sample fluid from the sample fluid inlet to the fluid outlet, and
a cleaning position in which the front edge portion of the first piston rod is set to operate the membrane to engage the valve seat to sealingly close off any flow of sample fluid from the sample fluid inlet to the sample flow outlet, while at the same time the front edge portion of the second piston rod is retracted such that a portion of the valve seat is exposed and a cleaning fluid thereby may flow from the cleaning fluid inlet, over the exposed portion and to the fluid outlet.

14. A method of operating a valve, the valve comprising:
a first piston comprising a first piston rod,
a first fluid chamber for the first piston, for enabling movement of the first piston and the first piston rod when fluid is introduced into the first fluid chamber,
a second piston comprising a second piston rod, the second piston rod being coaxially arranged with the first piston rod and radially enclosing at least a part of the first piston rod,
a second fluid chamber for the second piston, for enabling movement of the second piston and the second piston rod when fluid is introduced into the second fluid chamber,
a first fluid channel in communication with each of the first and the second fluid chambers, for effecting, when fluid is introduced into the first fluid channel and thereby also introduced into the first and the second fluid chambers, movement of the first piston and movement of the second piston,
a sample fluid inlet, a fluid outlet, a cleaning fluid inlet, a valve seat and a membrane, the membrane being operable to sealingly engage the valve seat by the first and the second piston rods of the actuator, and the first fluid chamber being defined by the first piston and a driver, the driver being slidably arranged in a housing of the actuator,
the method comprising setting first piston rod and the second piston rod between:
a closed position in which a front edge portion of the first piston rod and a front edge portion of the second piston rod are set to operate the membrane to engage the valve seat to sealingly close off any flow of sample fluid from the sample fluid inlet to the fluid outlet,
an open position in which the front edge portion of the first piston rod and the front edge portion of the second piston rod are set to operate the membrane to allow a flow of sample fluid from the sample fluid inlet to the fluid outlet, and
a cleaning position in which the front edge portion of the first piston rod is set to operate the membrane to engage the valve seat to sealingly close off any flow of sample fluid from the sample fluid inlet to the sample flow outlet, while at the same time the front edge portion of the second piston rod is retracted such that a portion of the valve seat is exposed and a cleaning fluid thereby may flow from the cleaning fluid inlet, over the exposed portion and to the fluid outlet.

* * * * *